US011593505B2

(12) United States Patent
Chau et al.

(10) Patent No.: US 11,593,505 B2
(45) Date of Patent: Feb. 28, 2023

(54) DATABASE ACCESS, MONITORING, AND CONTROL SYSTEM AND METHOD FOR REACTING TO SUSPICIOUS DATABASE ACTIVITIES

(71) Applicant: IDERA, INC., Houston, TX (US)

(72) Inventors: Binh Chau, Houston, TX (US); Amina Bukhari, Katy, TX (US)

(73) Assignee: IDERA, INC., Houston, TX (US)

( * ) Notice: Subject to any disclaimer, the term of this patent is extended or adjusted under 35 U.S.C. 154(b) by 195 days.

(21) Appl. No.: 16/575,594

(22) Filed: Sep. 19, 2019

(65) Prior Publication Data
US 2020/0097677 A1 Mar. 26, 2020

Related U.S. Application Data

(60) Provisional application No. 62/733,966, filed on Sep. 20, 2018.

(51) Int. Cl.
*G06F 21/62* (2013.01)
*G06F 16/17* (2019.01)

(52) U.S. Cl.
CPC ...... *G06F 21/6227* (2013.01); *G06F 16/1734* (2019.01); *G06F 2221/0775* (2013.01); *G06F 2221/2101* (2013.01)

(58) Field of Classification Search
CPC ............. G06F 21/6227; G06F 21/6245; G06F 16/245; G06F 16/1734; G06F 2221/0775;
(Continued)

(56) References Cited

U.S. PATENT DOCUMENTS

| 6,336,114 B1 * | 1/2002 | Garrison | ............. G06F 21/6218 707/999.009 |
| 7,085,780 B2 * | 8/2006 | Sakamoto | ........... G06F 16/2365 707/999.009 |

(Continued)

OTHER PUBLICATIONS

Patents Act 1977: Search Report under Section 117 in United Kingdom Intellectual Property Office Application No. GB/1913528. 4, dated Apr. 28, 2020, p. 1.
(Continued)

*Primary Examiner* — David Garcia Cervetti
(74) *Attorney, Agent, or Firm* — Kent Chambers; Terrile, Cannatti & Chambers, LLC.

(57) ABSTRACT

A database access, monitoring, and control system and method monitor database access, detect suspicious database activities, and react to suspicious database activities by initiating one or more control functions. In at least one embodiment, suspicious database activities include activities related to a number of rows of data retrieved in response to one or more queries within a predetermined threshold window of time. Data retrieval row count above a predetermined threshold that represents an anticipated maximum request for legitimate users can indicate a suspicious database activity. In at least one embodiment, the database access, monitoring, and control system and method detects suspicious database activities even if a data requestor has thwarted other security measures or if the data requestor has authorized access but is potentially accessing data inappropriately.

19 Claims, 5 Drawing Sheets

(58) Field of Classification Search
CPC ....... G06F 2221/2101; G06F 16/24564; G06F 21/6218; G06F 2221/2139; G06F 21/552; G06F 21/554; H04L 63/1416; H04L 63/1425; H04L 63/1408; H04L 63/10
See application file for complete search history.

(56) References Cited

U.S. PATENT DOCUMENTS

| | | | |
|---|---|---|---|
| 7,406,714 B1 | 7/2008 | Nachenberg | |
| 7,874,000 B1* | 1/2011 | Lal | G06F 21/55 726/25 |
| 8,056,141 B2* | 11/2011 | Shulman | G06F 21/6281 707/769 |
| 8,141,159 B2* | 3/2012 | Peled | G06F 21/316 726/1 |
| 8,209,342 B2* | 6/2012 | Srivastava | G06F 21/6254 707/757 |
| 8,504,481 B2* | 8/2013 | Motahari | G06F 21/577 706/3 |
| 9,680,830 B2* | 6/2017 | Feng | G06F 21/577 |
| 9,690,931 B1* | 6/2017 | Anantharaju | G06N 5/04 |
| 9,934,239 B2* | 4/2018 | Gkoulalas-Divanis | G06F 21/6218 |
| 10,742,674 B1* | 8/2020 | McLinden | H04L 63/1416 |
| 10,977,379 B1* | 4/2021 | Williams | G06F 21/604 |
| 11,074,238 B2* | 7/2021 | Kessler | G06F 16/221 |
| 11,321,320 B2* | 5/2022 | Azaria | G06N 3/0454 |
| 2003/0014394 A1* | 1/2003 | Fujiwara | G06F 21/6227 |
| 2003/0101355 A1* | 5/2003 | Mattsson | G06F 21/6227 726/23 |
| 2005/0049999 A1* | 3/2005 | Birn | G06F 11/3636 707/999.009 |
| 2005/0097149 A1 | 5/2005 | Vaitzblit et al. | |
| 2005/0203881 A1* | 9/2005 | Sakamoto | B29C 48/91 |
| 2005/0203921 A1* | 9/2005 | Newman | G06F 21/6227 |
| 2005/0262071 A1* | 11/2005 | Prager | G06F 16/217 |
| 2006/0031301 A1* | 2/2006 | Herz | G06F 21/6254 709/206 |
| 2006/0259950 A1* | 11/2006 | Mattsson | G06F 21/6227 726/1 |
| 2007/0027880 A1* | 2/2007 | Dettinger | G06F 21/6227 |
| 2007/0083928 A1* | 4/2007 | Mattsson | G06F 21/554 726/22 |
| 2007/0094265 A1* | 4/2007 | Korkus | G06F 21/316 707/999.009 |
| 2008/0065640 A1* | 3/2008 | Shulman | G06F 16/2443 707/999.009 |
| 2008/0208866 A1 | 8/2008 | Bhattacharjee et al. | |
| 2008/0288446 A1* | 11/2008 | Hu | G06F 16/2462 |
| 2009/0013194 A1* | 1/2009 | Mir | G06F 21/577 713/193 |
| 2011/0321175 A1* | 12/2011 | Slater | G06F 21/552 726/28 |
| 2013/0124467 A1* | 5/2013 | Naidu | G06F 16/27 707/610 |
| 2013/0227352 A1* | 8/2013 | Kumarasamy | G06F 11/3072 714/47.1 |
| 2014/0090085 A1* | 3/2014 | Mattsson | G06F 16/176 726/28 |
| 2016/0030834 A1* | 2/2016 | Brown | G06Q 30/0631 463/36 |
| 2016/0070490 A1* | 3/2016 | Koarashi | G06F 11/00 711/114 |
| 2016/0124955 A1* | 5/2016 | Nguyen | G06F 16/24532 707/725 |
| 2017/0134407 A1* | 5/2017 | Mason | H04L 63/1416 |
| 2017/0339150 A1* | 11/2017 | Barsness | G06F 21/6209 |
| 2018/0165470 A1* | 6/2018 | Nachenberg | H04L 9/0897 |
| 2018/0225330 A1* | 8/2018 | Agrawal | G06F 16/24534 |
| 2018/0278634 A1* | 9/2018 | Adir | G06F 21/577 |
| 2018/0288063 A1* | 10/2018 | Koottayi | H04L 63/1416 |
| 2018/0302426 A1* | 10/2018 | Lee | H04L 63/1425 |
| 2018/0375886 A1* | 12/2018 | Kirti | H04L 67/10 |
| 2019/0081950 A1* | 3/2019 | Baracaldo Angel | H04L 9/3226 |
| 2019/0156057 A1* | 5/2019 | Nissim Kobliner | G06F 16/9535 |
| 2019/0270001 A1* | 9/2019 | Cozad | A63F 13/61 |
| 2019/0294814 A1* | 9/2019 | Della Corte | G06F 21/6245 |
| 2020/0137084 A1* | 4/2020 | Roy | G06F 21/554 |
| 2020/0302078 A1* | 9/2020 | Fagan | G06F 21/566 |
| 2020/0311304 A1* | 10/2020 | Parthasarathy | G06F 11/3006 |
| 2022/0129064 A1* | 4/2022 | Gueye | G01C 21/3492 |

OTHER PUBLICATIONS

Patents Act 1977 Combined Search and Examination Report under Sections 17 and 18(3) filed in United Kingdom Intellectual Property Office Application No. GB/1913528.4, dated May 11, 2020, p. 1.
Patents Act 1977 Combined Search and Examination Report under Sections 17 and 18(3) filed in United Kingdom Intellectual Property Office Application No. GB/1913528.4, May 11, 2020, p. 1.
Written Opinion in United Kingdom Intellectual Property Office Application No. GB201913528, pp. 1-3.
Written Opinion in United Kingdom Intellectual Property Office Application No. GB201913258 pp. 1.
Letter dated May 11, 2020 from United Kingdom Intellectual Property Office, Concept House, South Wales, United Kingdom, filed in United Kingdom Intellectual Property Office Application No. GB1913528.4, pp. 1-3.
Canadian International Patent Office Application No. 3,055,993 Examination and Search Report dated Jul. 13, 2021, Canada, pp. 1-3.
Response to CIPO Examiner's Report Claims dated Dec. 1, 2022 filed in Canadian Patent Application No. 3,055,993, pp. 1-6.
Response to CIPO Examiner's Report Invention Disclosure dated Dec. 1, 2022 filed in Canadian Patent Application No. 3,055,993, pp. 1-3.
Response to CIPO Examiner's Report dated Dec. 1, 2022 filed in Canadian Patent Application No. 3,055,993, pp. 1-13.

\* cited by examiner

DATABASE ACCESS, MONITORING, AND CONTROL SYSTEM AND METHOD FOR REACTING TO SUSPICIOUS DATABASE ACTIVITIES

CROSS-REFERENCE TO RELATED APPLICATION

This application claims the benefit under 35 U.S.C. § 119(e) and 37 C.F.R. § 1.78 of U.S. Provisional Application No. 62/733,966, filed Sep. 20, 2018, and entitled "DATABASE ACCESS, MONITORING, AND CONTROL SYSTEM AND METHOD FOR REACTING TO SUSPICIOUS DATABASE ACTIVITIES," which is incorporated by reference in its entirety.

BACKGROUND

Field

The present invention relates in general to the field of databases, and more specifically to a database access, monitoring, and control system and method for reacting to suspicious database activities.

Description of the Related Art

A database is a collection of data. A database management system runs on computer systems and provides an interface between a user attempting to access the data and the physical memory systems that store the data. In general, the database management system processes a query, retrieves data responsive to the query, and sends the data to the requestor.

Often data stored in the database contains sensitive information. Sensitive data includes, for example, personal identifying information, contact information, health data, financial information, etc. Systems are often designed to restrict unauthorized access by authenticating the requestor. However, such systems have vulnerabilities, such as unauthorized acquisition and use of authorized access credentials, such as a user name and password, or use of programs designed to overcome or bypass a CAPTCHA process. Systems also use firewalls to prevent unauthorized access. However, firewalls also have vulnerabilities such as weak passwords and obtaining of passwords via deception. Systems may require user name and password validation or particular processes, such as a Completely Automated Public Turing test to tell Computers and Humans Apart ("CAPTCHA"), to distinguish between human and automated requestors. Additionally, a data requestor may have authorized access to a database but may still obtain data inappropriately. For example, a data requestor may attempt to access and receive more records than is reasonable under the circumstances. For example, a data requestor with access to employment data generally does not need to retrieve records on hundreds or thousands of employees concurrently.

SUMMARY

An embodiment of a database access, monitoring, and control system to detect and react to suspicious database activities includes a database management system to receive a database access query from a requestor to access data in a database and track event data associated with the database access query. The event data includes a number of rows retrieved from a table in the database that are responsive to the database access query. The system further includes an auditor-collection application to process the event data to identify characteristics of the event data, including the number of rows retrieved, that indicate the suspicious database activity and upon identifying the suspicious database activity, initiate a control function that is responsive to the suspicious database activity.

An embodiment of a database access, monitoring, and control method to detect and react to suspicious database activities includes receiving a database access query from a requestor to access data in a database. The method further includes tracking event data associated with the database access query, wherein the event data includes a number of rows retrieved from a table in the database that are responsive to the database access query. The method also includes processing the event data to identify characteristics of the event data, including the number of rows retrieved, that indicate the suspicious database activity and upon identifying the suspicious database activity, initiating a control function that is responsive to the suspicious database activity.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A database access, monitoring, and control system and method monitor database access, detect suspicious database activities, and react to suspicious database activities by initiating one or more control functions. In at least one embodiment, suspicious database activities include activities related to a number of rows ("row count") of data retrieved in response to one or more queries within a predetermined threshold window of time. Data retrieval row count above a predetermined threshold that represents an anticipated maximum request for legitimate users can indicate a suspicious database activity. Embodiments of the database access, monitoring, and control system and method are used in conjunction with or in lieu of conventional systems and methods to take action in response to unauthorized database access. In at least one embodiment, the database access, monitoring, and control system and method detect suspicious database activities even if a data requestor has thwarted other security measures or if the data requestor has authorized access but is potentially accessing data inappropriately. A "suspicious database activity" is an activity involving data in a database, such as accessing, attempting to access, modifying, and deleting the data, that may be unauthorized or otherwise be inappropriate. Reference herein to database "access" includes "attempted access" unless otherwise noted or clear from context.

In at least one embodiment, the database access, monitoring, and control system and method utilizes trace files to monitor database base activities including selecting particular event class data. In at least one embodiment, one or more event classes track specific properties of a database access that can correlate to suspicious database activity such as specific tables, row counts, column(s) accessed, queries used, or any combination of the foregoing. In at least one embodiment, the database access, monitoring, and control system and method process the database event class data to identify one or more specific characteristics of the event data that exceed a particular threshold indicating suspicious database activity. Upon identifying the suspicious database activity, the database activity monitoring system and method initiates a control function. The nature of the control function is a matter of design choice. For example, in at least one embodiment, the control function and/or provides a particular output signal. For example, in at least some embodiments, the control function transmits an output signal that triggers an alert to review and/or monitor the suspicious database activity, controls an output hold system to prevent release including transmission of requested data, or releases held data if the database access, monitoring, and control system and method determines that the data access is not a suspicious database activity.

Figure 1:
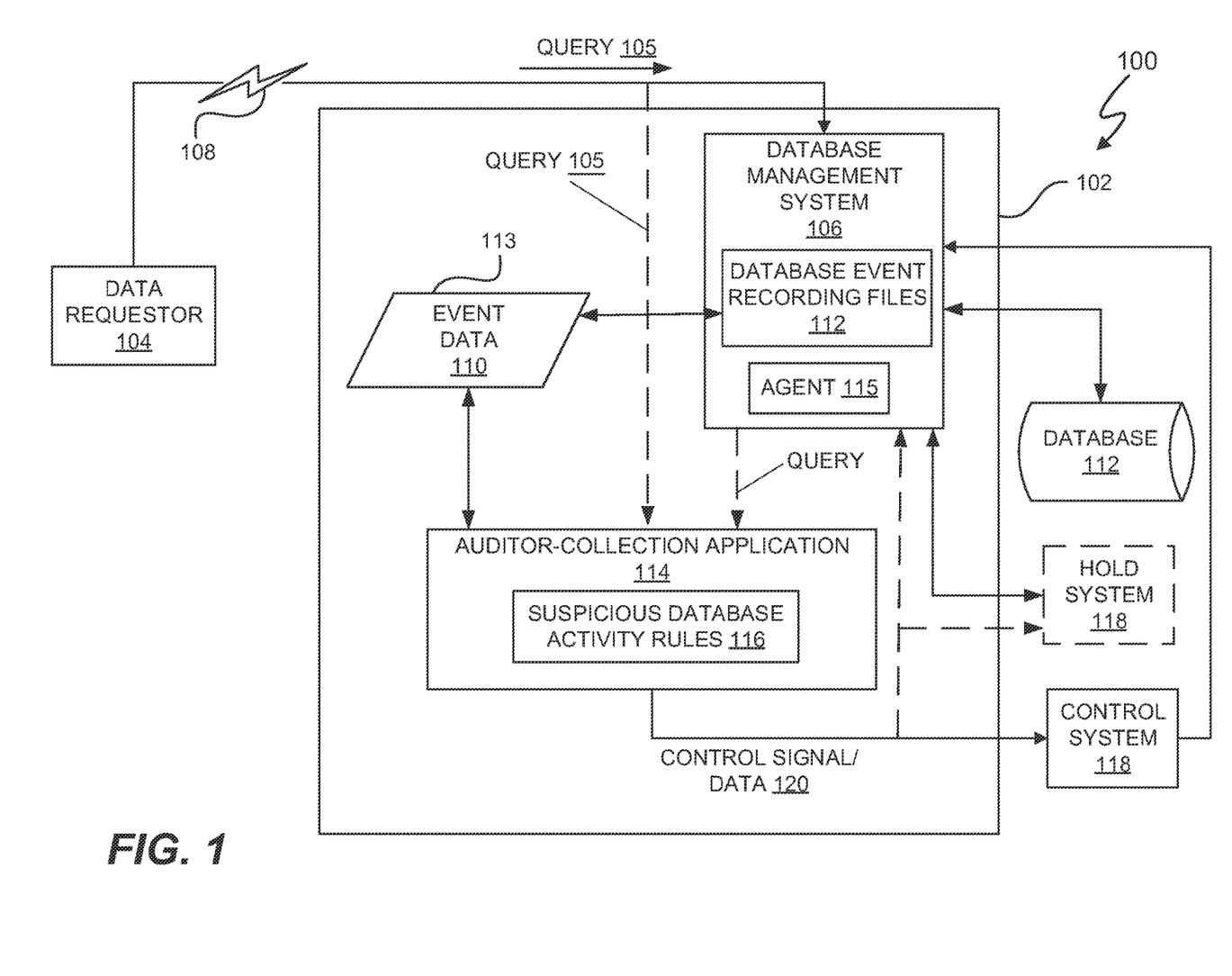
FIG. 1 depicts an exemplary database system that includes a database access, monitoring, and control system.
Figure 2:
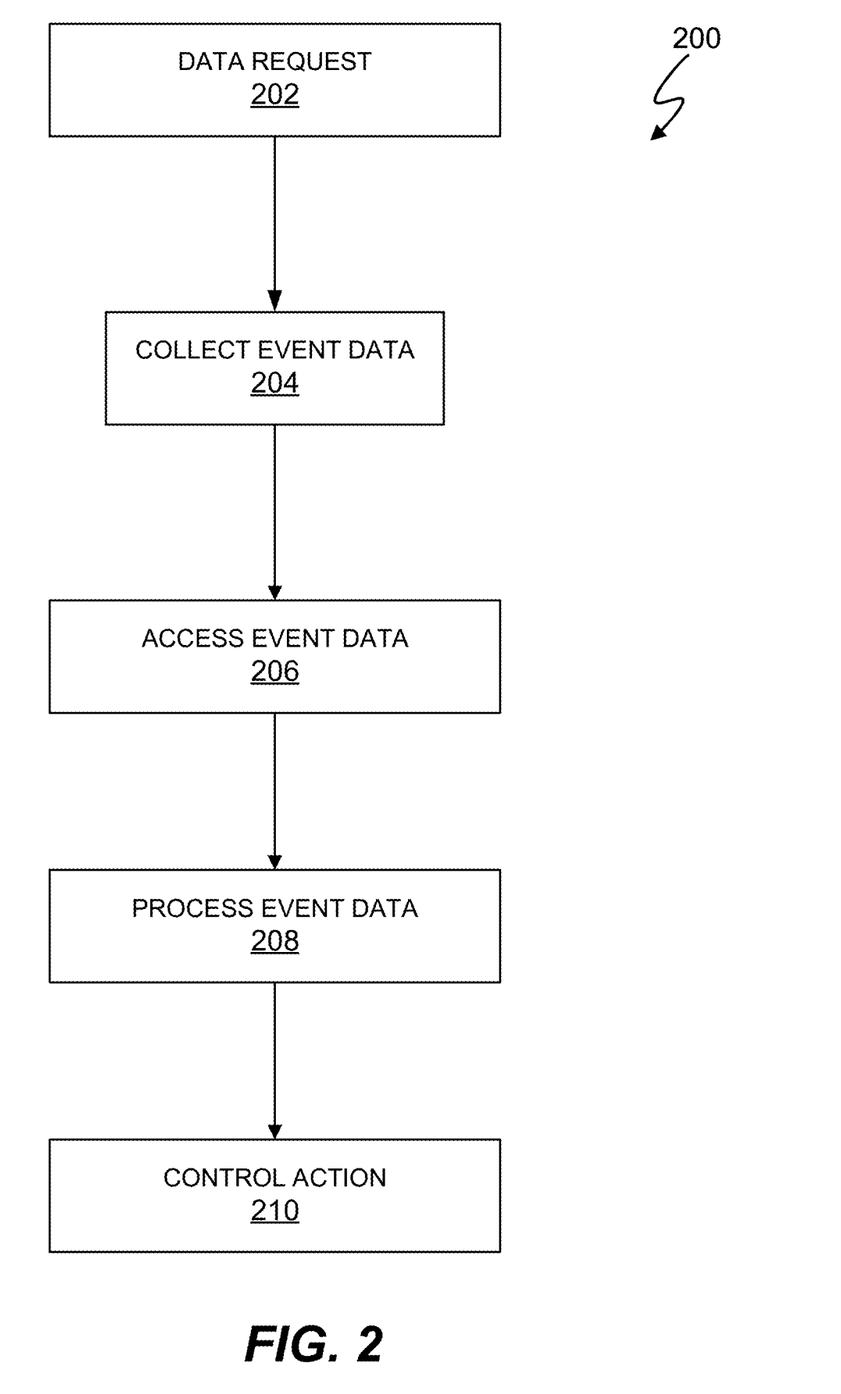
FIG. 2 depicts a database access, monitoring, and control process.

FIG. 1 depicts an exemplary database system 100 that includes a database access, monitoring, and control ("DAMC") system 102 that monitors database activities to detect and identify suspicious database activity and controls an appropriate response. FIG. 2 depicts a database access, monitoring, and control process 200, and, in at least one embodiment, the DAMC system 102 operates in accordance with the DAMC process 200. Embodiments of the DAMC system 102 and process 200 provide technical advantages over existing database security systems by, for example, detecting suspicious database activity by a data requestor regardless of whether the data requestor is authorized or unauthorized to access the requested data. Referring to FIGS. 1 and 2, in operation 202 of the DMA process 200, a data requestor 104 sends a requestor query 105 via a communication pathway 108 such as via the Internet or and/or a telecommunication system that is received by a database management system 106. The query 105 is any query on the database 112 such as a query statement SELECT [DATA] FROM [TABLE]. The data requestor 104 can be a human user or an application user of any electronic, computing system such as a mobile, laptop, or desktop computing system. The database management system 106 is any database management system, such as database management systems such as MySQL, SQL Server, Oracle, dBASE, and FoxPro. The database management system 106 converts the requestor query 105 into a specific command that retrieves data from the database 112 that is responsive the requestor query 105.

In operation 204, the DAMC system 102 collects event data 110 associated with the query 105. In at least one embodiment, the database management system 106 is configured to automatically generate database event recording files 112, such as database trace files, to collect the event data 110. The particular properties tracked are a matter of design choice, and at least a subset of the tracked properties are properties that can be processed by the auditor-collection application 114 to detect suspicious database activities. The event data 110 can include, for example, information related to a response from the database management system 106, information related to the data requestor 104, information related to the query 105 such as the number of rows retrieved (row count) in response to one or more queries within a predetermined threshold window of time, and type of records requested, chronological information such as a time and date of the query 105, and meta-data related to the nature of requested data. In at least one embodiment, suspicious database activities are a related row count in response to one or more queries within a predetermined threshold window of time include retrieval of a number of rows in response to a query 110 that exceeds a predetermined threshold and/or retrieval of a number of rows in response to multiple instances of query 110 that exceed the predetermined threshold within a predetermined window of time. In at least one embodiment, the event recording files 112 record the event data 110 directly and/or indirectly. For example, in at least one embodiment, the database management system 106 contains event classes that record and store specific sets of event data 110 associated with a query, such as the number of rows retrieved, table selected, and data requested, chronological information such as a time and date of the query 105, meta-data related to the nature of requested data, and the type of action taken on data, such as retrieve, view, modify, and/or delete.

The database event recording files 112 can be configured to select specific event classes and, thus, the event data 110, to indirectly obtain query associated properties. Event classes also record specific events related to query 105 and the data accessed including data retrieved by the query in database 112. For example, one or more event classes can record data that includes an identification of each column of each table in database 112 selected by the query 105, a number of records of each table in database 112 selected by the query 105, an identity of the data requestor 104, a time of query 105, and so on. The event recording files 112 can also or alternatively be configured to directly obtain such event data as well as information about the data requestor 104. In at least one embodiment, the event recording files 112, in addition to including event classes, are configured via the database management system 106 to include one or more trace files with a trace configuration tool, such as with SQL Server Profiler Trace. In at least one embodiment, an agent 115 is installed in the database management system 106 to automatically case the event data 110 to be saved in memory 113 for access by the auditor-collection application 114. In at least one embodiment, the auditor-collection application 114 installs the agent 115 in database management system 106. In at least one embodiment, the trace configuration file allows a user or an automated agent 115 to select particular event classes to include in each trace file. The database management system 106 stores the event data 110, such as trace files and event classes and associated data, in a memory space 113.

In operation 206, the auditor-collection application 114 accesses the event data 110. In at least one embodiment, the event data 110 is stored in a file system that can be automatically accessed by the auditor-collection application 114 using standard file system access operations. In at least one embodiment, the auditor-collection application 114 periodically determines if the event data 110 has been updated by, for example, checking file system modification time stamps. In at least one embodiment, the DAMC system 102 is configured to allow the auditor-collection application 114 to directly receive the query 105 (or at least an indication that DAMC system 102 received query 105) from the data requestor 104 in parallel with the database management system 106. In at least one embodiment, the database management system 106 provides the query 105 (or at least an indication that database management system 106 received query 105) to the auditor-collection application 114. In at least one embodiment, by receiving the query 105 or at least an indication that database management system 106 received the query 105, the auditor-collection application 114 can then access updated event data 110.

In operation 208, the auditor-collection application 114 processes the event data 110 to identify suspicious database activity. Based on the type of processing performed by the auditor-collection application 114, the auditor-collection application 114 or another entity configures the database management system 106 to save specific trace files that save specific event classes as event data 110. In at least one embodiment, the auditor-collection application 114 includes suspicious database activity rules 116 that process the event data 110 to detect suspicious database activity. In at least one embodiment, the outcome of operation 208 indicates that the auditor-collection application 114 either detected with some degree of probability or did not detect suspicious database activity. Upon completion of operation 208, auditor-collection application 114 proceeds to operation 210.

Figure 3:
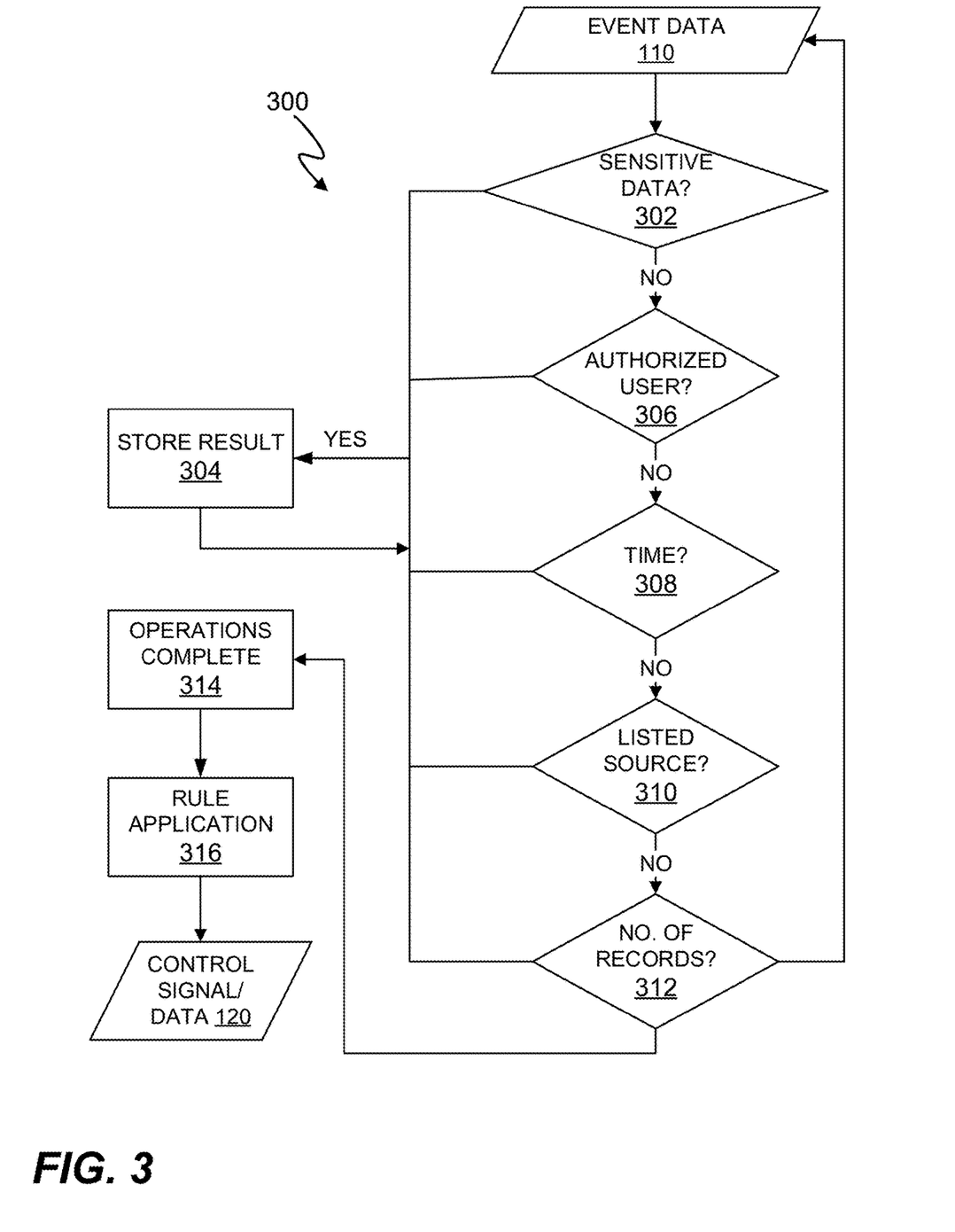
FIG. 3 depicts a suspicious database activity detection process.

FIG. 3 depicts suspicious database activity detection process 300, which represents an exemplary embodiment of operation 208. The auditor-collection application 114 executes the suspicious database activity detection process 300 detect suspicious database activity. The suspicious database activity detection process 300 includes operations that apply the suspicious database activity rules 116 to determine whether the event data 110 indicates suspicious database activity. The particular order, content, and applied rules and thresholds of operations to detect suspicious database activity is a matter of design choice. Operation 302 determines whether the event data 110 indicates the query 105 accessed or attempted to access sensitive data. In at least one embodiment as previously described, the event data 110 includes a list of identifications (e.g. names) of columns in tables of database 112 that contain sensitive data, and the suspicious database activity rules 116 include a list of column identifications for columns in database 112 that contain sensitive data, such as personal information including telephone numbers, addresses, social security numbers, healthcare information, and financial information. Operation 302 compares the list of column identifications in the event data 110 with the list of column identifications associated with sensitive data. If a match occurs, operation 302 determines that the query 105 is attempting to access or accessed sensitive data, and operation 304 stores the result of operation 302 if operation 302 detected suspicious database activity.

The suspicious database activity detection process 300 then proceeds to operation 306. Operation 306 determines if an unknown data requestor 104 sent the query 105. The auditor-collection application 114 includes a list of authorized data requestors, and operation 306 determines if the event data 110 indicates an authorized data requestor 104 sent the query 105 by comparing the list of authorized data requestors with the event data 110. If a match does not occur, operation 306 determines that an unauthorized user sent the query 105, and operation 304 stores the result of operation 306 if operation 302 detected the unauthorized user.

The suspicious database activity detection process 300 then proceeds to operation 308. Operation 308 determines if timing of the query 105 or multiples of query 105 is suspicious. There are multiple situations were timing of query 105 or multiples of query 105 is suspicious. For example, if a data requestor 104 sent the query 105 at a suspicious time outside of expected access times. The auditor-collection application 114 includes a list of expected database 112 access times. For example, if the database 112 is generally accessed only during work hours and/or on certain days, such as Monday-Friday, attempted accesses of database 112 outside time and date parameters configured in operation 308 are considered to be suspicious. Furthermore, timing can also relate to timing of multiples of query 105. For example, if query 105 is received multiple times within a predetermined time window, the multiples of query 105 could indicate suspicious activity. The number of times when query 105 is received and the time window for which the event is suspicious is a matter of design choice. For example, one query 105 that retrieved 100 records during a 1 hour window may not be suspicious, but the same query 105 received 10 times within the same 1 hour window would be suspicious and at least flag an alert. If operation 308 determines the event data 110 indicates a suspicious access time of query 105, operation 304 stores the result of operation 308.

The suspicious database activity detection process 300 then proceeds to operation 310. Operation 310 determines if a listed data requestor 104 machine sent the query 105. The auditor-collection application 114 includes a list of authorized data requestor 104 machines that are authorized to send the query 105. If operation 310 determines an unauthorized machine sent the query 105, operation 304 stores the result of operation 310.

The suspicious database activity detection process 300 then proceeds to operation 312. Operation 312 determines if the query 105 requested a number of records that exceeds a records retrieval threshold configured in auditor-collection application 114. Access to an excessive number of documents can indicate suspicious database activity. If operation 312 determines that the query 105 accessed or attempted to access a number of records that exceeds the records retrieval threshold, operation 304 stores the result of operation 312. Operation 314 determines that the suspicious database detection operations (i.e. operations 302, 306, 308, 310, and 312) have all completed.

Operation 316 applies the suspicious database activity rules 116 to the results stored by operation 304. The particular suspicious database activity rules 116 are a matter of design choice. In at least one embodiment, in the event all the outcomes of the suspicious database detection operations determined that the event data 110 did not indicate any suspicious database activity associated with the current query 105, operation 316 either generates a control signal/data 120 that indicates an absence of suspicious database activity or does not generate the control signal/data 120. In the event any of the outcomes of the suspicious database detection operations determined that the event data 110 indicated suspicious database activity, operation 316 generates the control signal/data 120 to indicate the presence of suspicious database activity associated with the event data 110 for the current query 105.

Referring to FIG. 1, the DAMC system 102 includes a control system 118 that receives the control signal/data 120. The content of the control signal/data 120 is a matter of design choice and can be used to control and provide information for one or more processes. For example, if the auditor-collection application 114 determines that the query 105 did not result in suspicious database activity, the database management system 106 returns the results of query 105 to the data requestor 104. If the auditor-collection application 114 determines that the query 105 resulted in suspicious database activity, the auditor-collection application 114 takes one or more specific actions, and the one or more specific actions are a matter of design choice. In at least one embodiment, the auditor-collection application 114 flags the query 105 as an alert and at least a subset of the event data 110 and submits the flag as an action/signal data 120 to a recipient (not shown) that monitors the alert flags and determines an appropriate response. The appropriate response is a matter of design choice. For example, the action/signal data 120 could cause the recipient to alter the suspicious activity database activity rules 116 to prevent or restrict subsequent accesses to the database 112 by the data requestor 104, enhance monitoring of all subsequent accesses to the database by the requestor system 104 by reconfiguring the suspicious database activity rules to be more restrictive in general or more restrictive to the data requestor 104, etc.

Referring to FIGS. 1 and 2, in operation 210, the auditor-collection application 114 generates the control signal/data 120 to initiate specific control action based detection of suspicious database activity by suspicious database activity detection process 300. The particular control action is a matter of design choice. In at least one embodiment, upon detection of suspicious database activity, the auditor-collection application 114 does not interfere with the database management system 106 response to query 105 and allows database management system 106 to return responsive data to the data requestor 104 but does generate a control signal/data 120 that indicates the detection of suspicious database activity. The suspicious database activity detection control signal/data 120 can be provided to a control system 118 that tracks suspicious database activity and, in at least one embodiment, determines whether to restrict access to database 112 by the data requestor 104 or allow access to continue but closely monitor the activity of the data requestor 104 associated with the suspicious database activity. In at least one embodiment, upon detection of suspicious database activity, the auditor-collection application 114 causes the database management system 106 to suspend all accesses to database 112 and sends control signal/data 120 to the control system 118 to resolve the nature of the suspicious database activity and release the suspension of data access to database 112. In at least one embodiment, the suspicious database activity rules 116 are configured to determine the significance of the suspicious database activity in order to continue or discontinue database access operations by database management system 106. In at least one embodiment, the significance can be determined by whether multiple suspicious database detection operations detected suspicious database activities or the degree of the suspicious database activity. An example of the degree of suspicious database activity is the number of records accessed is greater than X, such as 100, but less than Y, such as 500, and indicates minor suspicious database activity, or greater than or equal to Y and indicates major suspicious database activity. In the former case, the auditor-collection application 114 generates a control signal/data 120 to flag the suspicious database activity, such as an excessive row count retrieval, and in the latter case, the auditor-collection application 114 generates a control signal/data 120 to directly control the database management system 106 and suspend access to database 112. In at least one embodiment, the control signal/data 120 includes at least a text message, such as a simple short message service (SMS) text message.

In at least one embodiment, the DAMC system 102 includes an optional hold system 118 that prevents the release of data responsive to query 105 until the auditor-collection application 114 generates a control signal/data 120 that allows the hold system 118 to release data to data requestor 104 that is responsive to the query 105. In at least one embodiment, the hold system 118 allows the DAMC 102 gather data responsive to the query 105 concurrently with the operation of suspicious database activity detection process 300 and quickly provide the responsive data upon release by the control signal/data 120. Thus, the hold system 118 can minimize the delay impact of auditor-collection application 114 detecting suspicious database activity while allowing the database management system 106 to retrieve responsive data and provide the data if released by the control signal/data 120. The permutations and control actions that can be taken by the auditor-collection application 114 and the control system 118 in accordance with the suspicious database activity rules 116 is a matter of design choice and is virtually limitless. The optional hold system 118 can be external or internal to the DAMC system 102.

Figure 4:
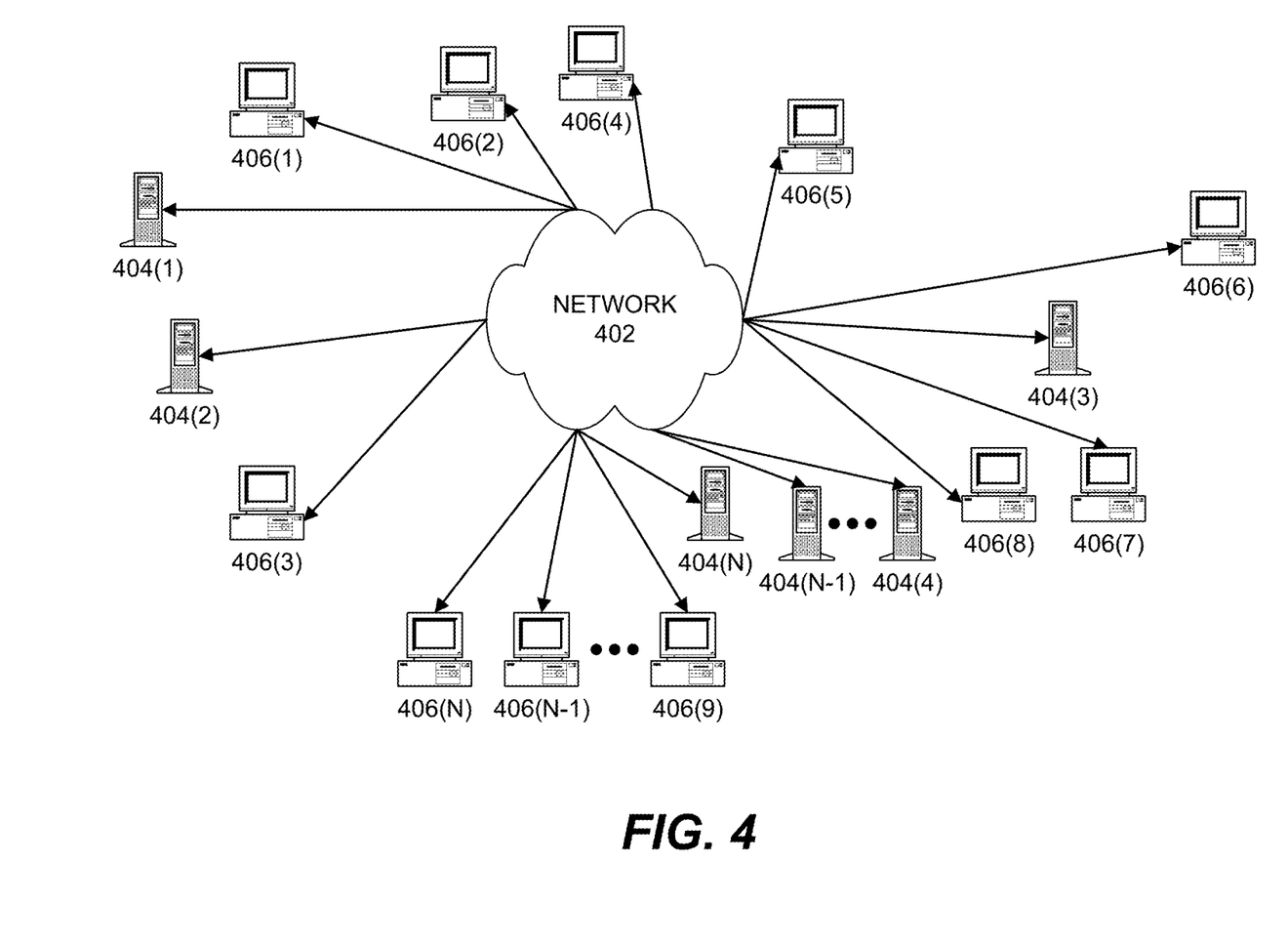
FIG. 4 depicts an exemplary network environment in which the system of FIG. 1 and the processes of FIGS. 2 and 3 may be practiced.

FIG. 4 is a block diagram illustrating a network environment in which the database system 100 and DAMC process 200 may be practiced. Network 402 (e.g. a private wide area network (WAN) or the Internet) includes a number of networked server computer systems 404(1)-(N) that are accessible by client computer systems 406(1)-(N), where N is the number of server computer systems connected to the network. Communication between client computer systems 406(1)-(N) and server computer systems 404(1)-(N) typically occurs over a network, such as a public switched telephone network over asynchronous digital subscriber line (ADSL) telephone lines or high-bandwidth trunks, for example communications channels providing T1 or OC3 service. Client computer systems 406(1)-(N) typically access server computer systems 404(1)-(N) through a service provider, such as an internet service provider ("ISP") by executing application specific software, commonly referred to as a browser, on one of client computer systems 406(1)-(N).

Client computer systems 406(1)-(N) and/or server computer systems 404(1)-(N) may be, for example, computer systems of any appropriate design, including a mainframe, a mini-computer, a personal computer system including notebook computers, a wireless, mobile computing device (including personal digital assistants, smart phones, and tablet computers). When programmed to implement at least one embodiment of the database system 100 and DAMC process 200, the computer systems are specialized machines. These computer systems are typically information handling systems, which are designed to provide computing power to one or more users, either locally or remotely. Such a computer system may also include one or a plurality of input/output ("I/O") devices coupled to the system processor to perform specialized functions. Tangible, non-transitory memories (also referred to as "storage devices") such as hard disks, compact disk ("CD") drives, digital versatile disk ("DVD") drives, and magneto-optical drives may also be provided, either as an integrated or peripheral device. In at least one embodiment, the database system 100 and DAMC process 200 can be implemented using code stored in a tangible, non-transient computer readable medium and executed by one or more processors. In at least one embodiment, the database system 100 and DAMC process 200 can be implemented completely in hardware using, for example, logic circuits and other circuits including field programmable gate arrays.

Figure 5:
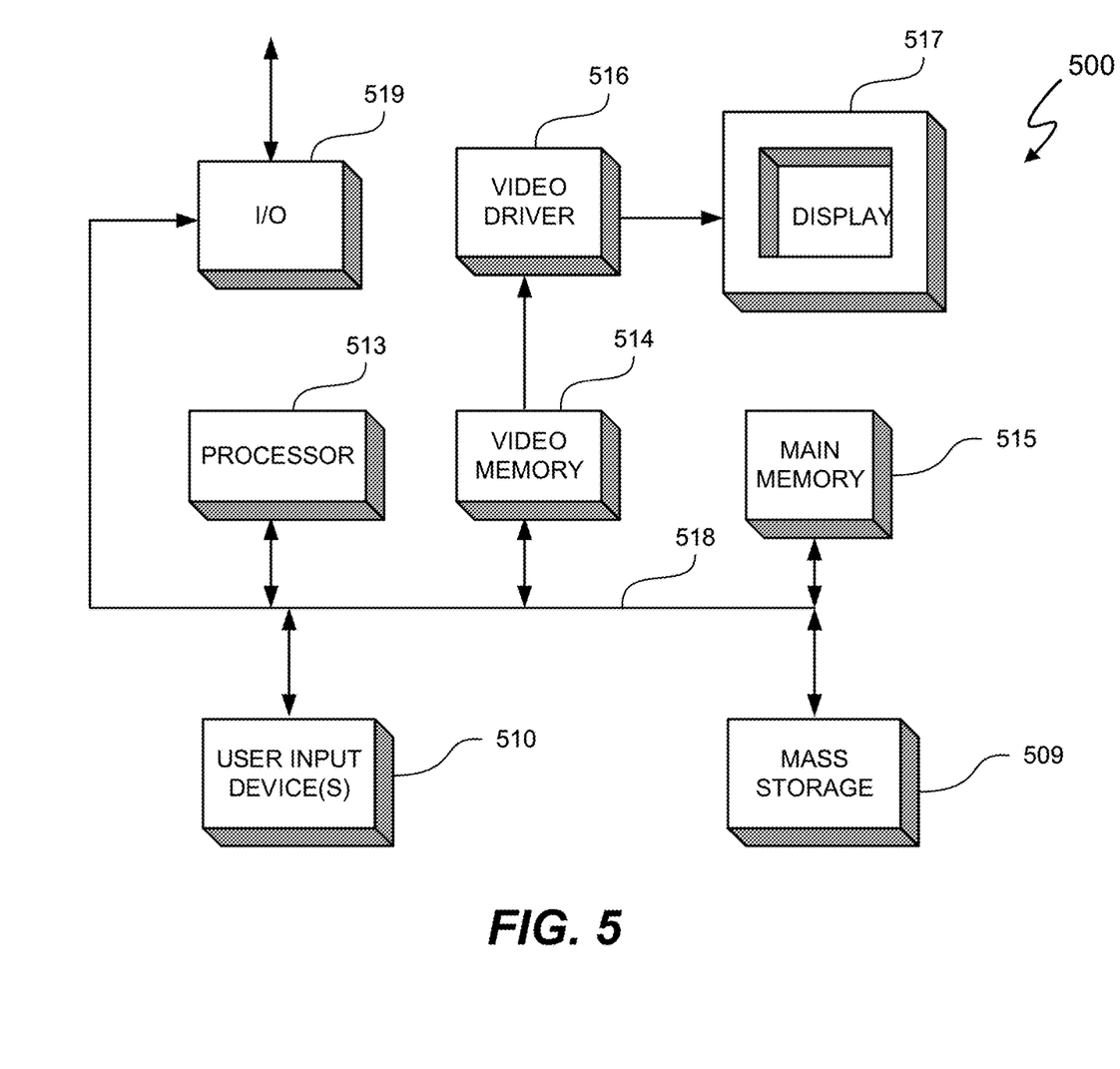
FIG. 5 depicts an exemplary computer system.

Embodiments of the database system 100 and DAMC process 200 can be implemented on a computer system such as a general-purpose computer 500 illustrated in FIG. 5. The computer 500 can be a dedicated computer system or a virtual, emulated system located in, for example, a cloud computing environment. Input user device(s) 510, such as a keyboard and/or mouse, are coupled to a bi-directional system bus 518. The input user device(s) 510 are for introducing user input to the computer system and communicating that user input to processor 513. The computer system of FIG. 5 generally also includes a non-transitory video memory 514, non-transitory main memory 515, and non-transitory mass storage 509, all coupled to bi-directional system bus 518 along with input user device(s) 510 and processor 513. The mass storage 509 may include both fixed and removable media, such as a hard drive, one or more CDs or DVDs, solid state memory including flash memory, and other available mass storage technology. Bus 518 may contain, for example, 32 of 64 address lines for addressing video memory 514 or main memory 515. The system bus 518 also includes, for example, an n-bit data bus for transferring DATA between and among the components, such as CPU 509, main memory 515, video memory 514 and mass storage 509, where "n" is, for example, 32 or 64. Alternatively, multiplex data/address lines may be used instead of separate data and address lines.

I/O device(s) 519 may provide connections to peripheral devices, such as a printer, and may also provide a direct connection to remote server computer systems via a telephone link or to the Internet via an ISP. I/O device(s) 519 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in a non-transient computer readable medium such as a flash memory, optical memory, magnetic memory, compact disks, digital versatile disks, and any other type of memory. The computer program is loaded from a memory, such as mass storage 509, into main memory 515 for execution. Computer programs may also be in the form of electronic signals modulated in accordance with the computer program and data communication technology when transferred via a network. The method and functions relating to database system 100 and DAMC process 200 may be implemented in a computer program. In at least one embodiment, Java applets or any other technology is used with web pages to allow a user of a web browser to make and submit selections and allow a client computer system to capture the user selection and submit the selection data to a server computer system.

The processor 513, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 515 is comprised of dynamic random access memory (DRAM). Video memory 514 is a dual-ported video random access memory. One port of the video memory 514 is coupled to video amplifier 516. The video amplifier 516 is used to drive the display 517. Video amplifier 516 is well known in the art and may be implemented by any suitable means. This circuitry converts pixel DATA stored in video memory 514 to a raster signal suitable for use by display 517. Display 517 is a type of monitor suitable for displaying graphic images.

The computer system described above is for purposes of example only. The database system 100 and DAMC process 200 may be implemented in any type of computer system or programming or processing environment. It is contemplated that the database system 100 and DAMC process 200 might be run on a stand-alone computer system, such as the one described above. The database system 100 and DAMC process 200 might also be run from a server computer systems system that can be accessed by a plurality of client computer systems interconnected over an intranet network. Finally, the database system 100 and DAMC process 200 may be run from a server computer system that is accessible to clients over the Internet.

Although embodiments have been described in detail, it should be understood that various changes, substitutions, and alterations can be made hereto without departing from the spirit and scope of the invention as defined by the appended claims.

What is claimed is:

1. A database access, monitoring, and control system to detect and react to suspicious database activities, the system comprising:
a database management system to receive a database access query from a requestor to access data in a database and track event data associated with the database access query, wherein the event data includes a number of rows retrieved from a table in the database that are responsive to the database access query;
an auditor-collection application to process the event data to identify characteristics of the event data, including the number of rows retrieved during a predetermined threshold window of time, that indicate the suspicious database activity and upon identifying the suspicious database activity, initiate a control function that is responsive to the suspicious database activity; and
a control system to execute the control function and resolve a nature of the suspicious database activity, wherein to execute the control function comprises to:
enhance monitoring of all subsequent accesses to the database by at least the requestor; and
reconfigure one or more suspicious database activity rules to be more restrictive in allowing access to the data in the database in general or more restrictive to the requestor.

2. The database access, monitoring, and control system of claim 1 wherein to process the event data to identify characteristics of the event data, including the number of rows retrieved, that indicate the suspicious database activity comprises to:
process the event data to identify one or more specific characteristics of the event data that exceed a threshold indicating suspicious database activity; and
identify the database access query as suspicious database activity when the one or more specific characteristics of the event data exceed the threshold.

3. The database access, monitoring, and control system of claim 1 wherein the database management system is further configured to:
execute one or more event classes of one or more event recording files to track the event data associated with the database access query.

4. The database access, monitoring, and control system of claim 3 wherein the event recording files are configured to include one or more configurable trace files to select particular event classes to include in each trace file.

5. The database access, monitoring, and control system of claim 1 wherein:

to initiate a control function that is responsive to the suspicious database activity comprises at least one or more of:

transmitting an output signal that triggers an alert to review or monitor the suspicious database activity;

controlling a control system to cause holding of the data responsive to the database access query and prevent release of the held data; and allowing the database management system to release held data upon determination that the database access is not a suspicious database activity.

6. The database access, monitoring, and control system of claim 5 wherein the control function is a function of configurable rules.

7. The database access, monitoring, and control system of claim 1 wherein:

after receiving the database access query and before tracking the event data associated with the database access query, the database management system is further configured to:

collect the event data associated with the query;

automatically generate database event recording files, including a database trace files, to collect the event data.

8. The database access, monitoring, and control system of claim 1 wherein the event data further comprises at least one of:

i. a number of rows retrieved from multiple tables;
ii. access of specific tables;
iii. columns accessed in at least the table.
iv. information related to the requestor;
v. type of records requested;
vi. chronological information of the query;
vii. meta-data related to the nature of requested data; and
viii. any combination of elements i-vii.

9. The database access, monitoring, and control system of claim 1 wherein the auditor-collection application is further configured to:

periodically determine if the event data has been updated; and when the event data has been updated:

track the updated event data associated with the database access query, wherein the updated event data includes a number of rows retrieved from a table in the database that are responsive to the database access query;

process the updated event data to identify characteristics of the one or more events that indicate the suspicious database activity; and upon identification of the suspicious database activity, initiate a control function that is responsive to the suspicious database activity.

10. A database access, monitoring, and control method to detect and react to suspicious database activities, the method comprising:

receiving a database access query from a requestor to access data in a database; and executing code, stored in a memory, by a processor to cause the processor to perform operations comprising:

tracking event data associated with the database access query, wherein the event data includes a number of rows retrieved during a predetermined threshold window of time from a table in the database that are responsive to the database access query;

processing the event data to identify characteristics of the event data, including the number of rows retrieved, that indicate the suspicious database activity;

upon identifying the suspicious database activity, initiating a control function that is responsive to the suspicious database activity; and executing the control function and resolve a nature of the suspicious database activity, wherein to execute the control function comprises to:

enhancing monitoring of all subsequent accesses to the database by at least the requestor; and reconfiguring one or more suspicious database activity rules to be more restrictive in allowing access to the data in the database in general or more restrictive to the requestor.

11. The method of claim 10 wherein processing the event data to identify characteristics of the event data, including the number of rows retrieved, that indicate the suspicious database activity comprises:

processing the event data to identify one or more specific characteristics of the event data that exceed a threshold indicating suspicious database activity; and identifying the database access query as suspicious database activity when the one or more specific characteristics of the event data exceed the threshold.

12. The method of claim 10 further comprising:

executing one or more event classes of one or more event recording files to track the event data associated with the database access query.

13. The method of claim 12 wherein the event recording files are configured to include one or more configurable trace files to select particular event classes to include in each trace file.

14. The method of claim 10 wherein:

initiating a control function that is responsive to the suspicious database activity comprises at least one or more of:

transmitting an output signal that triggers an alert to review or monitor the suspicious database activity;

controlling a database management system to hold data responsive to the database access query and prevent release of the held data; and allowing a database management system to release held data upon determination that the database access is not a suspicious database activity.

15. The method of claim 14 wherein the control function is a function of configurable rules.

16. The method of claim 10 wherein:

after receiving the database access query and before tracking the event data associated with the database access query, the method further comprises:

collecting the event data associated with the query;

automatically generating database event recording files, including a database trace files, to collect the event data.

17. The method of claim 10 wherein the event data further comprises at least one of:

i. a number of rows retrieved from multiple tables;
ii. access of specific tables;
iii. columns accessed in at least the table.
iv. information related to the requestor;
v. type of records requested;
vi. chronological information of the query;
vii. meta-data related to the nature of requested data; and
viii. any combination of elements i-vii.

18. The method of claim 10 wherein the auditor-collection application is further configured to:
  periodically determining if the event data has been updated;
  when the event data has been updated:
    tracking the updated event data associated with the database access query, wherein the updated event data includes a number of rows retrieved from a table in the database that are responsive to the database access query;
    processing the updated event data to identify characteristics of the one or more events that indicate the suspicious database activity; and
    upon identifying the suspicious database activity, initiating a control function that is responsive to the suspicious database activity.

19. A computer program product comprising code stored therein that is executable by a processor to perform the method of claim 10.

* * * * *